June 25, 1935.   R. G. YAXLEY   2,006,226
PIPE AND MEANS AND METHOD OF PROTECTING SAME
Filed June 28, 1933
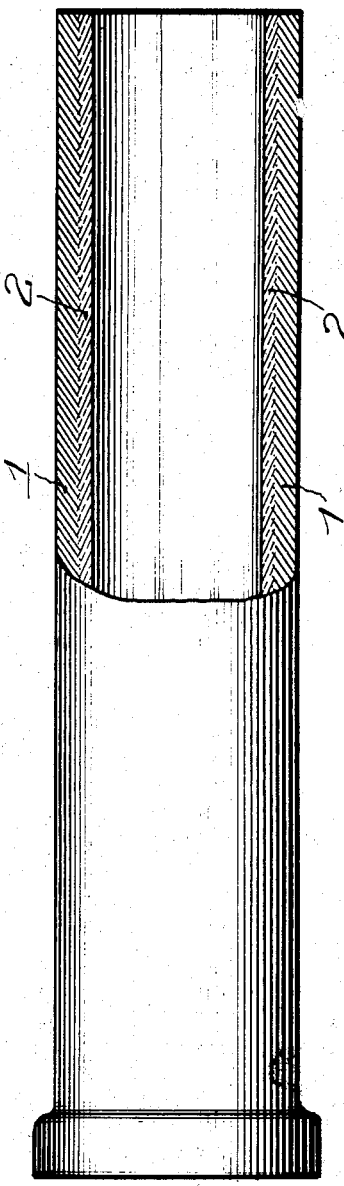
Inventor,
Robert Gordon Yaxley,
Parkinson + Lane, Attys.
Witness:
Chas. R. Koursh.

Patented June 25, 1935

2,006,226

UNITED STATES PATENT OFFICE 2,006,226

PIPE AND MEANS AND METHOD OF PROTECTING SAME

Robert Gordon Yaxley, Waterford, N. Y.

Application June 28, 1933, Serial No. 678,013

2 Claims. (Cl. 137—75)

The present invention relates to linings or coatings for water or fluid carrying pipes, and more in particular to a novel means and method of lining such a pipe and in the article formed thereby.

In order to provide a protection against corrosion and other destructive and deteriorating forces to pipes, and more in particular to water mains or other pipes carrying liquid or other fluid, it has been proposed to line the interior thereof with cement. This lining has several distinct disadvantages. In the first place, after the pipe has been lined, it is essential that the cement be properly cured and treated. It is then generally maintained wet until used thereby to prevent the lining from cracking or checking. Such a lining readily cracks or pulls away from the metal of the pipe after the pipe has been placed in use for carrying water or other fluid and the calcium or lime content of the cement is withdrawn with the water passing therethrough and the water thereupon becomes hard. Such removal of the calcium or lime from the cement, causes a cracking and disintegration of the lining and a separation thereof from the pipe.

Among the objects of the present invention is to provide a novel means and method of lining a pipe adapted to carry water or other fluids and which lining is intimately and permanently affixed thereto.

A further object of the invention is the formation or construction of a pipe provided with a novel protective lining or coating.

A still further object of the invention is the provision of a novel lining for a pipe in which the lining is fused, baked or glazed to the pipe.

Another object of the invention is the novel method of lining a pipe adapted to carry water or other fluid in which the lining is applied thereto by centrifugal force whereby to completely and accurately line the surface of the pipe.

A still further object of the invention is the manufacture of a water pipe or the like in which the pipe is centrifugally cast and lined against corrosion or deterioration in a single operation.

Yet another object of the present invention is to provide a novel means and method of lining the interior of a pipe adapted to carry water or other fluid, whereby to form a protective coating thereat. In the present embodiment, the material forming the lining is added to the pipe as it is being cast, and by centrifugal force is built up on the interior of the pipe due to its lower specific gravity than that of the material forming the body of the pipe. The lining when so formed is fused, baked or glazed to the pipe and the invention further contemplates the use of any material having the property of resisting corrosion or deterioration of the pipe and which has a melting point approximately that of the material from which the pipe has been made.

Further objects, advantages and capabilities will later more fully appear and are inherently possessed thereby. While there is disclosed a preferred embodiment, it is to be understood that the invention is not limited thereto, but comprehends and is susceptible of other modifications and changes without departing from the spirit of the invention.

In the drawing, the figure discloses a pipe 1 for carrying water or other liquid or fluid, provided with a lining 2 fused, baked or glazed thereon at the time that the pipe is being formed.

In the manufacture of pipe for carrying water or other fluid, such pipe is now most generally cast or formed by a centrifugal process in which the contour and thickness of the pipe may be accurately controlled and formed by centrifugal force. In such process or manufacture, the material of the pipe is accurately and compactly formed, thereby eliminating blow holes and any uneven thickness of the pipe. The present invention contemplates forming a protective lining or covering on the interior of the pipe during the above described process or manufacture, whereby the lining or covering is fused, baked or glazed thereon by the heat necessary to melt and maintain the material or pipe in a molten state as it is being formed. It is further contemplated that the exterior may also be coated or lined when it is desired to protect the outer surface.

The present invention further contemplates the use for such lining or covering, of slag from steel mills, porcelains, glass, enamels, or in fact any material having the property of forming an effective lining or covering for protecting the surface of the pipe and which material has the approximate melting point of the iron or metal making up the pipe. Thus the iron or metal of the pipe and the slag or other material adapted to form the lining or coating can be melted or poured together, and due to the difference in specific gravity of the iron or metal of the pipe and the material for forming the lining or coating, the iron or metal will form on the exterior and the lining on the interior as the aggregate is being revolved. Thus there is an intimate bond, fusion or cohesion of the lining or covering and the pipe.

Having thus disclosed the invention, I claim:

1. A new article of manufacture comprising a metal conduit for carrying liquid and a lining of slag intimately and permanently fused on and bonded to the interior of the conduit for protecting the surface of said conduit against corrosion and deterioration, said lining being insoluble in the liquid carried by the conduit.

2. A new article of manufacture, comprising a conduit for carrying liquid, and a permanent protective convering of slag intimately formed on and bonded to the inner surface of said conduit and insoluble in the liquid carried thereby whereby to protect the same against corrosion and deterioration.

ROBERT GORDON YAXLEY.